United States Patent [19]
Smernoff

[11] 3,799,681
[45] Mar. 26, 1974

[54] VARIABLE COMPUTING RESISTOR
[75] Inventor: Ronald B. Smernoff, Belmont, Calif.
[73] Assignee: Analytical Products, Inc., Belmont, Calif.
[22] Filed: May 19, 1972
[21] Appl. No.: 255,157

[52] U.S. Cl................ 356/223, 250/210, 324/98, 338/89, 356/227, 356/228
[51] Int. Cl......................... G01j 1/42, H01c 5/00
[58] Field of Search...... 356/223, 227, 228; 338/89; 250/210; 324/98

[56] References Cited
UNITED STATES PATENTS
| | | | |
|---|---|---|---|
| 1,971,238 | 8/1934 | Silling | 338/89 |
| 3,245,304 | 4/1966 | Davis | 356/227 |
| 2,938,184 | 5/1960 | Mayer | 338/89 |
| 2,902,607 | 9/1959 | Hedger et al. | 338/89 |

FOREIGN PATENTS OR APPLICATIONS
694,260 7/1940 Germany .............................. 338/89

Primary Examiner—Ronald L. Wibert
Assistant Examiner—V. P. McGraw
Attorney, Agent, or Firm—Moore, Zimmerman & Dubb

[57] ABSTRACT

A variable computing resistor is disclosed for representing non-linear curves in null or bridge circuits. A flexible resistive rod is used or resistor components are placed in end-to-end sequential electrical communication. A first conducting terminal is connected to one end of the flexible resistive rod or to one end of the sequentially connected resistor components and a second conducting terminal is moveably attached to the resistive rod or the sequentially connected resistor components. The second conducting terminal serves as a center tap and is driven by a servo-mechanism to tap the resistive rod or sequentially connected resistor components to match the voltage from an external electrical source. The position of the second conductive terminal is associated with an indicator on a substantially linear scale. The external electrical source may, for example, be the voltage produced by a non-linear thermocouple or a photometer output from light transmitted through a sample solution. By selecting the resistances and orientations of the flexible resistive rod or the resistor components non-linear data can be translated into a readout on the substantially linear scale. Non-linear phenomena such as thermocouple response curves or sample radiation absorption curves can be translated into a linear readout of temperature or concentration.

6 Claims, 2 Drawing Figures

PATENTED MAR 26 1974　　　　　　　　　　　　　　　　　3,799,681

VARIABLE COMPUTING RESISTOR

BACKGROUND OF THE INVENTION

My invention relates to a variable computing resistor having adjustably differing resistances per unit scale reading thereof. The resistor is useful in null balance circuits and is especially useful in apparatus for measuring the absorption of radiation by samples which only approximately obey Beer's Law.

Photometers which measure the light transmitted through a sample are commonly used for determining the concentration of solutes in solution or of gaseous species. These photometers are designed so that the voltage output thereof is linearly proportional to the amount of light transmitted through a sample contained in the test cell of the photometer. The transmittance for a sample T is equal to $V/V_o$ where V and $V_o$ are the voltage outputs obtained by passing light through, for example, a solution containing a particular solute and through a "blank" solution (a solution which contains the same solvent but zero solute).

Beer's Law presents a relationship between the concentration of the solute in solution and transmitted light. This relationship is $C = K \log_{10} I_o/I$ where C is the concentration of the solute in solution, K is a constant characteristic of the solute, I is the intensity of light transmitted through a solution having a solute of concentration C therein and $I_o$ is the intensity of light transmitted through a solution having zero solute therein. It is clear that T, which is equal to $V/V_o$, is also equal to $I/I_o$. Thus, concentration as a function of voltage is, if Beer's Law is followed, given by the equation $C = K \log_{10} (V_o/V)$.

It is well known that, for a number of solutes, if one plots C against $\log_{10} V_o/V$ one will not obtain a perfectly straight line. The degree of variation from linearity of such a plot is a function of the solute, the concentration of the solute in solution and the degree to which the light being used in the photometer is monochromatic. Generally, the higher the concentration of the solute in solution, the more complex the molecule of the solute so that variations from Beer's Law are more likely, and the less monochromatic the light is the more the variation will be from the ideal Beer's Law relation.

When accurate concentration measurements are desired it is customary to plot a calibration of the measuring circuit by preparing a series of solutions having different amounts of solute therein. The curve might be a plot, for example, of concentration verses $\log_{10} V_o/V$; then, when the concentration of an unknown solution is to be determined, $V_o/V$ is measured with the unknown solution in the photometer, $\log_{10} V_o/V$ is calculated, and the corresponding concentration C determined from examination of the calibration curve. This is a very time consuming method. Such a method is especially undesirable for use in medical laboratories wherein a great number of samples must often be analyzed with a high degree of accuracy and in a short period of time. In medical laboratories it has in fact been the custom to sacrifice accuracy somewhat in the interest of speed. This is generally accomplished by assuming that Beer's Law is exactly followed for the solute being determined. Accordingly the photometers used in medical laboratories are usually standardized only against a blank solution and a single standard solution and it is then presumed that the concentration of solute in an unknown solution can be determined from the line defined by these two points.

Photometric analyzers have been designed which will provide a readout directly in concentration. Relevant patents in this regard are U. S. Pat. No. 3,031,917 of Milton H. Pelavin and U. S. Pat. No. 3,245,304 of John E. Davis. In the apparatus described in these patents the output of a photometric analyzer is balanced in a null balance circuit with a logarithmically wound potentiometer so that the voltage derived therefrom satisfies the inverse logarithmic relationship of absorbance, i.e., $C = K (\log_{10} V_o/V)$. The recorder means described in U. S. Pat. No. 3,031,917 provides a somewhat corrected curve of concentration versus log of light transmittance. However, the curve obtained in nowhere near linear. And, further, it is necessary to go through an elaborate calculation to provide the logarithmic resistor used in the recorder means of U. S. Pat. No. 3,031,917.

Accordingly, it is an object of this invention to provide an improved automatic apparatus for directly recording concentration on a linear scale whereby corrections are made for deviations from Beer's Law.

A further object of the invention is to provide a variable computing resistor having adjustably differing resistances per unit scale reading thereof, said variable computing resistor being particularly useful in null balance circuits wherein said variable computing resistor is connected to match an external electrical signal.

A still further object of the invention is to provide a variable computing resistor for use in an apparatus for measuring the absorption of radiation by a sample, said variable computing resistor being capable of being calibrated against a series of solutions having a known concentration of solute and thereby providing an output reading compensated for deviations from Beer's Law, said output reading being substantially linear in concentration.

SUMMARY OF THE INVENTION

The variable computing resistor of the present invention directly converts transmittance into concentration on a linear scale. A blank solution and a series of standard solutions of known concentration are prepared. The blank solution, in an appropriate container, is inserted first into the photometer sample cavity. The zero adjustment on the photometer is then used to insure that the concentration scale reads zero concentration for the blank. Each standard solution, starting with the standard solution that has the least amount of solute therein, is successively placed into the sample cavity. The variable computing resistor of the invention is successively adjusted as discussed in detail below until the indicator on the concentration scale shows the exact amount of solute known to be in each standard solution. Once the variable computing resistor of the invention has been adjusted in this manner the concentration of solute in an unknown solution can be determined by simply placing the unknown solution in the sample cavity of the photometer and reading the concentration as indicated by the indicator on the linear concentration scale. The variable computing resistor must of course be readjusted when the concentration of a different solute is being determined.

Usually, when performing photometric chemical analysis, it is necessary that the samples to be tested vary from each other in concentration of solute by only a relatively small amount. This is because in the usual photometric chemical analysis only a single standard solution is used and it is assumed that Beer's Law will be followed. When the variable computing resistor of the present invention is used in a photometric analyzer it is possible to measure the concentration of solute over a larger range of concentration. This is possible because the variable computing resistor corrects for deviations from Beer's Law by using a plurality of standard solutions.

BRIEF DESCRIPTION OF THE DRAWINGS

The invention will be better understood by reference to the drawings which are hereby incorporated in and made a part of this specification and in which.

DESCRIPTION OF THE PREFERRED EMBODIMENT

Figure 1:
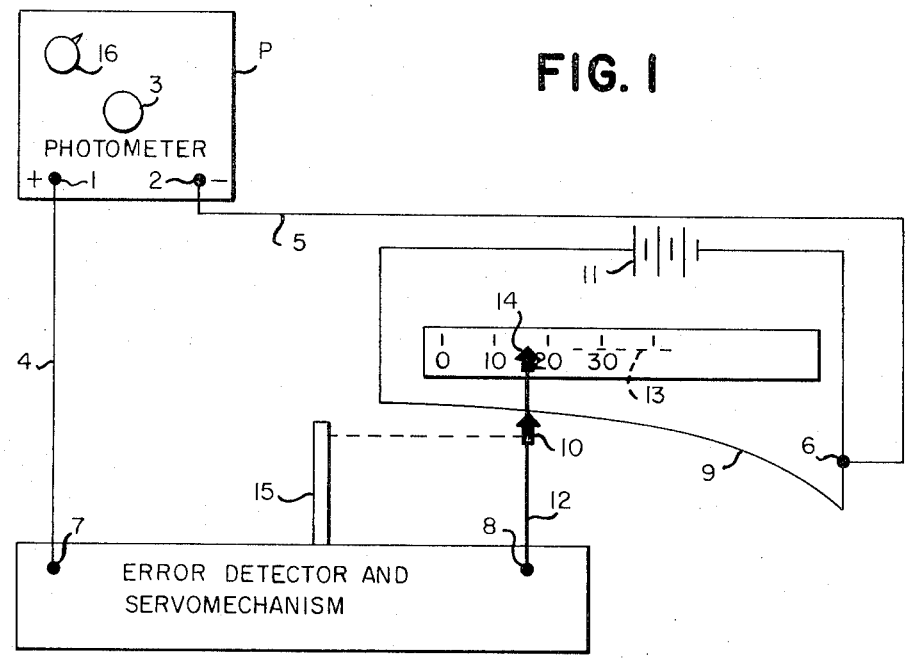
FIG. 1 illustrates diagrammatically a photometer which incorporates the variable computing resistor of the present invention to conduct photometric chemical analysis.

Referring to FIG. 1, the photometer P is any photometer of the prior art having terminals 1 and 2 which provide a voltage that is substantially linearly proportional to the light transmitted through a sample held in sample cavity 3. The photometer terminals 1 and 2 are connected via leads 4 and 5 to input terminal 7 of the voltage error signal servomechanism and voltage bridge terminal 6 respectively.

Whenever there is a non zero voltage across the terminals 7 and 8 of the voltage error signal servomechanism S, moveable element 15 moves until the center tap 10 is adjusted to a position at which there is no longer a net voltage difference between terminals 7 and 8 or the servomechanism. Moveable element 15 may directly drive center tap 10 by a mechanical linkage or may drive center tap 10 by electromechanical or other means. As can be readily seen by examination of FIG. 1 the center tap 10 of the computing resistor 9 is connected via lead 12 to terminal 8 of the servomechanism S. Also, the indicator 14 directly indicates the concentration of solute in the sample being tested on the linear concentration scale 13. As may be further seen from examination of FIG. 1 a standard voltage source 11 is applied across the variable computing resistor 9 as part of the null balance voltage bridge.

Since the voltage output of the photometer differs when samples having different amounts of solute therein are placed in the sample cavity 3 it is apparent that the position of the indicator 14 will be determined by the concentration of the solute in the sample cavity 3.

The servomechanism S includes an amplifier and a motor for driving the moveable element 15. The output from the positive terminal 1 of the photometer P and a variable fraction of the voltage across the variable computing resistor of the invention are applied differentially to the voltage error signal servomechanism input terminals 7 and 8 to provide an error signal. The voltage error signal servomechanism then operates in the usual manner for such mechanisms to adjust the center tap 10 of the variable computing resistor until the servomechanism input has zero error. At this point the position of the indicator 14 and moveable element 15 in relation to the concentration scale 13 indicates the concentration of solute in the sample being tested.

The voltage source 11 may be a battery or any other voltage source. Often photometers are designed so as to provide two outputs one of which is proportional to the concentration of solute in a sample being tested and the other of which is a constant voltage equal to that voltage which is obtained when a blank solution is in the photometer sample cavity. The constant voltage from such a photometer may then be used as the constant voltage source.

The center tap 10 of the variable computing resistor applies a positive voltage via lead 12 to the servomechanism input terminal 8. The other servomechanism input terminal 7 receives a positive input from the photometer positive output terminal 1 via lead 4. The tap 10 of the variable computing resistor is automatically adjusted to a null balance point by the servomechanism moveable element 15, the mechanical connection between tap 10 and moveable element 15 being shown by a dashed line.

Figure 2:
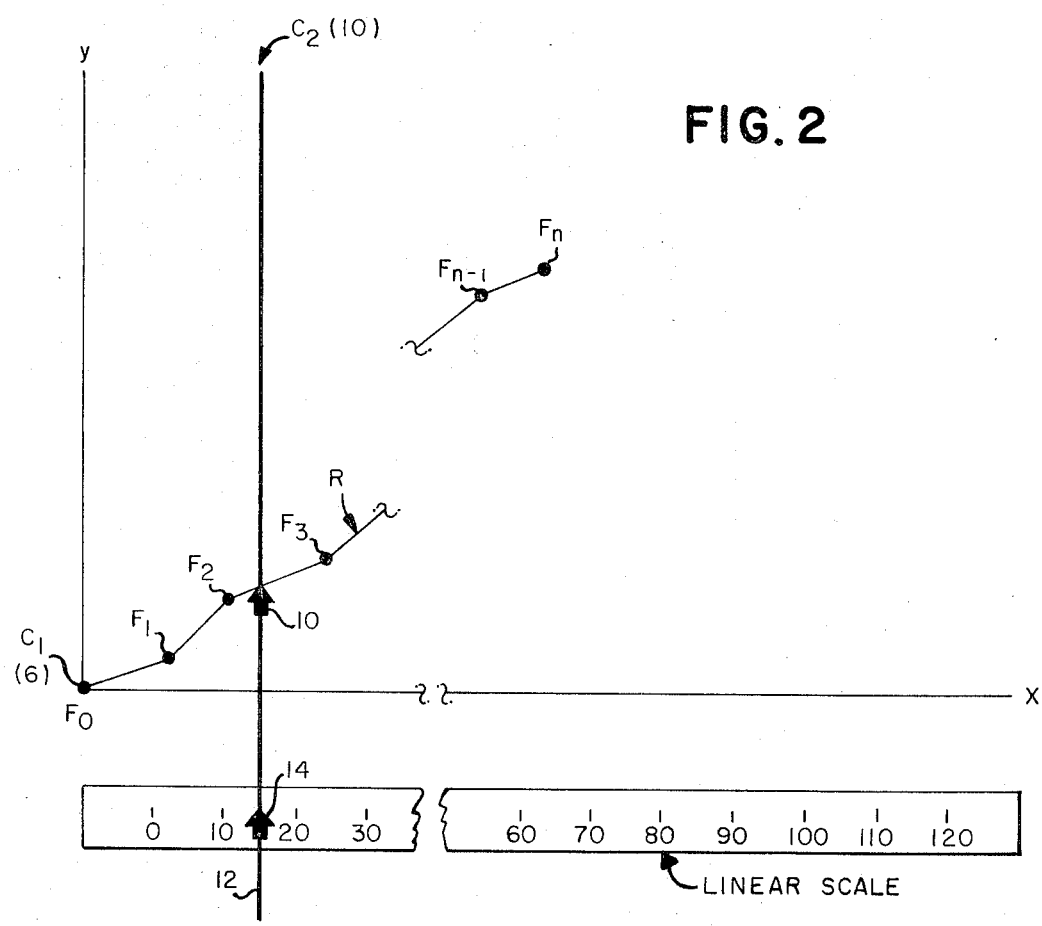
FIG. 2 illustrates diagramatically the variable computing resistor of the present invention.

Reference is now made to FIG. 2 wherein one embodiment of the variable computing resistor of the present invention is illustrated. This embodiment of the computing resistor of the present invention consists of a planer surface defining the quadrant $y - F_o - x$. A flexible rod, R, having a finite and non-zero resistance per unit length, such as a wire wound flexible elongated potentiometer element, is attached to said quadrant at $F_o$. Equivalent resistive means, e.g., sequentially connected resistor components can also the used. A conducting terminal, $C_1$, is attached to said rod, R, at or near said $F_o$. The conductor, $C_2$, corresponds to tap 10 of FIG. 1 and moveably contacts the resistor rod, R, at points along the rod in the quadrant. The sliding conducting terminal $C_2$ is attached to the indicator 14 and the lead 12, shown in both FIG. 1 and FIG. 2. A plurality of means, $F_n$, are detachably attachable to the flexible rod, R. Each $F_n$ is also detachably attachable to the quadrant $y - F_o - x$, and each $F_n$ is spaced successively further away from said $F_o$ along said R, so that the $x -$ and $y -$ coordinates or each of the $F_n$ are successively further away from said $F_o$ along the $x -$ and $y -$ axis, respectively.

The variable computing resistor is calibrated by the following method. A blank solution and a series of $n$ solutions, each of the n solutions having a different concentration of solute, are prepared. The concentration of solute increases as the value of n increases; i.e., the concentration of solute in solution 6 is greater than that in solution 5 which in turn is greater than that in solution 4, etc.

The blank solution is placed in the sample holder 3 of the photometer and the zero control 16 of the photometer P of FIG. 1 is adjusted until the indicator 14 shows zero concentration. The solution having the lowest concentration of solute is then placed in the sample holder 3 of the photometer P. $F_1$ is slideably attached to R. $F_1$ is moved to a position in the quadrant $y - F_o - x$ wherein the $x -$ coordinate thereof corresponds on the substantially linear scale 13 to the concentration of solute known to be in the standard solution. $F_1$ while remaining slideably attached to R, is then moved in the $y$ direction along a line parallel to the $y$ axis until the indicator 14 moves to a position on the concentration scale which corresponds to the concentration of the solute in the standard solution. Then $F_1$ is used to detachably attach R to the planer surface $y - F_o - x$ at this point. The next most concentrated standard solution is then put into the sample holder 3 of the photometer P. $F_2$ is slideably attached to R. $F_2$ is then moved to a position in the quadrant $y - F_o - x$ wherein the $x$ — coordinate thereof corresponds on the substantially linear scale 13 to the known concentration of the solute in the second standard solution. The position of $F_2$ is then adjusted in the $y$ direction on a line parallel to the y axis until the indicator 14 indicates the known concentration of the second standard solution on concentration scale 13. $F_2$ is then used to detachably attach R to the $y - F_o - x$ quadrant at this point. This process is continued until the variable computing resistor has been adjusted for each of the standard solutions.

It is clear that by using the variable computing resistor of the present invention concentration can be directly and accurately determined especially if the locations of the n points are judiciously chosen. Deviations or variations from Beer's Law are corrected for by the use of multiple standards. The variable computing resistor can of course be re-calibrated for different solutes. Further, the concentration of solute in an unknown can be quickly and accurately read off of a linear concentration scale.

The variable computing resistor of the present invention has uses in substantially any null balance circuit, including, e.g., Wheatstone and other resistance bridge circuits. For example, the variable computing resistance of the invention may find use in resistance bridge circuits wherein thermocouples are used, where pressure transducers are used, where moisture content measuring instruments are used, where strain gauges are used, where ovens are temperature programmed controlled, etc. In many of these and other uses which will be apparent to one skilled in the art the relationships being linearized are monotonically varying, for example almost linearly increasing functions but are definitely not logarithmic. In any of these uses the variable computing resistor of the invention will correct for deviations from linearity to provide a linear output. Thus, it is understood that the detailed description of the invention above is not to be taken in a limiting sense, but, the invention is rather to be interpreted in view of what one skilled in the art might make therefrom and, therefore, the invention is intended to be limited only by the scope and spirit of the appended claims.

I claim:

1. A variable computing resistor having adjustable differing resistances per unit scale reading thereof, comprising:

A planer surface defining a quadrant, the reference sides of said quadrant being the positive $x$ axis and the positive $y$ axis, said $x$ axis and said $y$ axis intersecting at right angles at a point $F_o$;

A substantially linear scale along said positive $x$ axis;

A flexible conducting element rod, R, having a finite and non-zero resistance per unit length, one end of said rod, R being attached to said quadrant at said $F_o$;

A first conducting terminal, $C_1$, attached to said rod, R at or near said $F_o$;

A plurality of means, $F_n$, for fastening said R to said surface at a plurality of points, each $F_n$ being detachably attachable to said surface and slideably attachable to said rod, R, each $F_n$ being spaced successively further away from $F_o$ along said rod, R, $x_n$ the $x$ coordinate of each fastening means $F_n$ being spaced further away from said $F_o$ along said positive $x$ axis than $x_{n-1}$, the $x$ coordinate of the preceeding fastener $F_{n-1}$ and $y_n$ the $y$ coordinate of each fastening means $F_m$ being spaced further away from said $F_o$ along said positive $y$ axis than $y_{n-1}$ the $y$ coordinate of the preceeding fastener $F_{n-1}$;

A second conducting terminal, $C_2$, in moveable electrical communication with said rod, R, between the position of said first conducting terminal $C_1$ and the end of the rod, R, which extends into said quadrant; and An indicator extending from said second conducting terminal $C_2$ to said substantially linear scale along said positive $x$ axis.

2. A null balance circuit, comprising, a variable computing resistor having adjustable differing resistances per unit scale reading thereof, said resistor comprising:

A planer surface defining a quadrant, the reference sides of said quadrant being the positive $x$ axis and the positive $y$ axis, said $x$ axis and said $y$ axis intersecting at right angles at a point $F_o$;

A substantially linear scale along said positive $x$ axis;

A flexible conducting element rod, R, having a finite and non-zero resistance per unit length, one end of said rod, R being attached to said quadrant at said $F_o$;

A first conducting terminal, $C_1$, attached to said rod, R at or near said $F_o$;

A plurality of means, $F_n$, for fastening said R to said surface at a plurality of points, each $F_n$ being detachably attachable to said surface and slideably attachable to said rod, R, each $F_n$ being spaced successively further away from $F_o$ along said rod, R, $x_n$ the $x$ coordinate of each fastening means $F_n$ being spaced further away from said $F_o$ along said positive $x$ axis than $x_{n-1}$, the $x$ coordinate of the preceding fastener $F_{n-1}$ and $y_n$ the $y$ coordinate of each fastening means $F_n$ being spaced further away from said $F_o$ along the positive $y$ axis than $y_{n-1}$ the $y$ coordinate of the preceding fastener $F_{n-1}$;

A second conducting terminal, $C_2$, in moveable electrical communication with said rod, R, between the position of said first conducting terminal $C_1$ and the end of the rod, R, which extends into said quadrant; and An indicator extending from said second conducting terminal $C_2$ to said substantially linear scale along said positive $x$ axis, In combination with:

an external electrical signal and a means to vary the position of said moveable conducting terminal $C_2$ so that the voltage of said external electrical signal may be matched to the voltage drop across said variable computing resistor, said voltage being indicated on said substantially linear scale.

3. An apparatus for measuring the absorption of radiation by a sample through which said radiation passes, comprising:

A photometer whose output is proportional to the intensity of radiation transmitted through said sample;

A voltage error signal servomechanism the first input terminal of which is electrically connected to the first output terminal of said photometer;

A variable computing resistor having adjustable differing resistances per unit scale reading thereof, said resistor comprising:

A planer surface defining a quadrant, the reference sides of said quadrant being the positive $x$ axis and the positive $y$ axis, said $x$ axis and said $y$ axis intersecting at right angles at a point $F_o$;

A substantially linear scale along said positive $x$ axis;

A flexible conducting element rod, R, having a finite and non-zero resistance per unit length, one end of said rod, R being attached to said quadrant at said $F_o$;

A first conducting terminal, $C_1$, attached to said rod, R at or near said $F_o$;

A plurality of means, $F_n$, for fastening said R to said surface at a plurality of points, each $F_n$ being detachably attachable to said surface and slideably attachable to said rod, R, each $F_n$ being spaced successively further away from $F_o$ along said rod, R, $X_n$, the X coordinate of each fastening means $F_n$ being spaced further away from said $F_o$ along said positive $x$ axis than $x_{n-1}$, the $x$ coordinate of the preceding fastener $F_{n-1}$ and $y_n$ and $y$ coordinate of each fastening means $F_n$ being spaced further away from said $F_o$ along said positive $y$ axis than $y_{n-1}$ the $y$ coordinate of the preceding fastener $F_{n-1}$;

A second conducting terminal, $C_2$, in moveable electrical communication with said rod, R, between the position of said first conducting terminal $C_1$ and the end of the rod, R, which extends into said quadrant; and An indicator extending from said second conducting terminal $C_2$ to said substantially linear scale along said positive $x$ axis, wherein said first conducting terminal $C_1$ is placed in electrical communication with the second output terminal of said photometer and wherein said moveable conducting terminal, $C_2$, is electrically connected to the second input terminal of said voltage error signal servomechanism; and A constant voltage supply connected across said resistor.

4. A variable computing resistor for transforming nonlinear data into a linear readout, comprising;

A plurality of elongated resistor components, said resistor components being connectable in end-to-end sequential electrical communication on a planer surface and having varying angles with respect to each other, each of said resistor components having a fixed and uniform resistance per unit length thereof;

A first conducting terminal, $C_1$, in electrical communication with said sequentially connected resistor components at or near the unconnected end of the first resistor component of said plurality of resistor components;

A second conducting terminal, $C_2$, placed in moveable electrical communication with said end-to-end sequentially connected resistor components and disposed to move from the position of said first conducting terminal, $C_1$, to the unconnected end of the last resistor component of said end-to-end sequentially connected resistor components; and A substantially linear scale having an indicator whose position is determined by the position of said second conducting terminal, $C_2$, on said end-to-end sequentially connected resistor components.

5. A null balance circuit, comprising a variable computing resistor, said resistor comprising:

A plurality of elongated resistor components, said resistor components being connectable in end-to-end sequential electrical communication on a planer surface and having varying angles with respect to each other, each of said resistor components having a fixed and uniform resistance per unit length thereof;

A first conducting terminal, $C_1$, in electrical communication with said sequentially connected resistor components at or near the unconnected end of the first resistor component of said plurality of resistor components;

A second conducting terminal, $C_2$, placed in moveable electrical communication with said end-to-end sequentially connected resistor components and disposed to move from the position of said first conducting terminal, $C_1$, to the unconnected end of the last resistor component of said end-to-end sequentially connected resistor components; and A substantially linear scale having an indicator whose position is determined by the position of said second conducting terminal, $C_2$, on said end-to-end sequentially connected resistor components, in combination with an external electrical signal and a means to vary the position of said moveable conducting terminal $C_2$ so that the voltage of said external electrical signal may be matched to the voltage drop across said variable computing resistor, said voltage being indicated on said substantially linear scale.

6. An apparatus for measuring the absorption of radiation by a sample through which said radiation passes, comprising;

A photometer whose output is proportional to the intensity of radiation transmitted through a sample;

A voltage error signal servomechanism the first input of which is electrically connected to the first output terminal of said photometer;

A variable computing resistor, comprising:

A plurality of elongated resistor components, said resistor components being connectable in end-to-end sequential electrical communication on a planer surface and having varying angles with respect to each other, each of said resistor components having a fixed and uniform resistance per unit length thereof;

A first conducting terminal, $C_1$, in electrical communication with said sequentially connected resistor components at or near the unconnected end of the first resistor component of said plurality of resistor components;

A second conducting terminal, $C_2$, placed in moveable electrical communication with said end-to-end sequentially connected resistor components and disposed to move from the position of said first conducting terminal, $C_1$, to the unconnected end of the last resistor component of said end-to-end sequentially connected resistor components; and A substantially linear scale having an indicator whose position is determined by the position of said second conducting terminal, $C_2$, on said end-to-end sequentially connected resistor components, wherein said first conducting terminal $C_1$ is placed in electrical communication with the second output terminal of said photometer and wherein said moveable conducting terminal, $C_2$, is electrically connected to the second input terminal of said voltage error signal servomechanism; and A constant voltage supply connected across said resistor.

* * * * *